United States Patent [19]

Bobry

[11] Patent Number: 4,747,035

[45] Date of Patent: * May 24, 1988

[54] ISOLATOR FOR POWER SYSTEM INSTRUMENT

[76] Inventor: Howard H. Bobry, 16006 Village Creek Dr., Suite C, Mill Creek, Wash. 98012

[ * ] Notice: The portion of the term of this patent subsequent to May 26, 2004 has been disclaimed.

[21] Appl. No.: 944,008

[22] Filed: Dec. 22, 1986

Related U.S. Application Data

[63] Continuation-in-part of Ser. No. 697,152, Feb. 1, 1985, Pat. No. 4,669,037.

[51] Int. Cl.$^4$ .............. H02M 3/335; H01J 29/52; H04N 5/04
[52] U.S. Cl. .................... 363/24; 324/118; 315/371; 315/384; 358/148
[58] Field of Search .............. 363/16, 24, 127, 69, 363/97, 41; 323/902; 324/118; 315/371, 384; 358/148-150

[56] References Cited

U.S. PATENT DOCUMENTS 4,638,240 1/1987 Pauker et al. .............. 363/97 X
4,665,475 5/1987 Brandstatter .............. 363/97 X
4,669,037 5/1987 Bobry .............. 363/24

Primary Examiner—Patrick R. Salce
Assistant Examiner—Emanuel Todd Voeltz
Attorney, Agent, or Firm—Pearne, Gordon, McCoy & Granger

[57] ABSTRACT

A device for isolating an electrical instrument from an input voltage signal at a floating potential. The device includes a transformer with a center-tapped primary winding, a center-tapped secondary winding and a core magnetically coupling the primary and secondary windings. The input voltage signal is applied to an input terminal coupled to the center tap of the primary winding. A modulator circuit is connected to the primary winding for alternately applying the input voltage signal to opposite sections of the primary winding by means of FETs, or the like, isolated from a control circuit by a transformer, the control circuit alternately switching the modulator circuit at a suitable modulating frequency. A demodulator circuit is connected to the secondary winding for alternately connecting each end of the secondary winding to a common return point to demodulate the output signal from the center tap of the secondary winding by means of FETs or the like, controlled by the control circuit, which remains at ground potential.

6 Claims, 3 Drawing Sheets

ISOLATOR FOR POWER SYSTEM INSTRUMENT

CROSS REFERENCE TO RELATED APPLICATION

This application is a continuation-in-part of application Serial No. 697,152, U.S. Pat. No. 4,669,037 filed Feb. 1, 1985.

BACKGROUND OF THE INVENTION

This invention relates to circuit isolation devices and especially to devices for isolating a voltage signal that is "floating" at some potential from another electrical device, such as an electrical instrument.

Normally, electrical instruments must be operated at ground potential for safety reasons.

More particularly, the invention relates to circuit isolators that use:

(1) a transformer to convert one initial voltage signal floating at some potential (upon modulation) to a representative voltage signal (upon demodulation) at ground potential; and (2) switching means for modulating the initial voltage that isolate, or provide no direct current path between the input and output of the isolator so that the control circuit for operating the modulating and demodulating circuits may be at ground potential.

It is frequently desirable to observe and/or measure voltage waveforms that are offset or "floating" by a significant voltage from ground. This is commonly accomplished by disconnecting the safety ground of the oscilloscope or other instrument being used, and allowing the instrument to float above ground potential. This practice is hazardous as accidental contact with the instrument case can result in lethal shock.

The types of electrical devices that need isolation of the type to which the present invention is directed include current shunts, physiological and medical instruments, and oscillographs and oscilloscope-type instruments.

Shunts (low value resistors) are often used for the measurement of DC current in applications such as power supplies, rectifiers, battery chargers, DC motor drives, inverters and battery plants. In many applications, the shunt voltage is to be monitored by a digital meter or a current sensing and/or control device. In such applications there is frequently a need for the shunt to be "floating" at a different potential from ground than the instrumentation or control circuitry.

In the case of physiological and medical instruments, electrical isolation is essential for patient protection. Also, physiological signals are of very low voltage, and it is essential that the instrumentation used not introduce noise.

In the case of oscillographs and oscilloscopes, there are a wide range of applications where isolation may be desirable. These applications include power system monitoring, machine vibration monitoring, mechanical shock and vibration testing, and others.

As the need for such electrical devices has increased due to the expanding use of sophisticated power supply inverters, motor drives and the like, several devices have been introduced that isolate the voltage signal from the instrument, thus allowing for safer utilization. For example, a transformer can provide isolation and a high degree of accuracy at medium to high frequencies. At low frequencies, however, the size of the transformer (i.e., the core area) must be increased in order to avoid saturation and this reduces accuracy at high frequencies. Transformer isolators cannot be used at all when the input signal has a DC component.

Photo couplers can also be used but these devices have wide variations in gain and poor linearity. Also, these devices are relatively slow so that their application is limited to the lower frequencies.

Isolators presently in use are large and expensive. The Tektronix AG902A, for example, is two-channel a isolator having a volume of about ⅝ cu. ft. and a weight of over 13 lbs. This device is larger, heavier and more expensive than many of the oscilloscopes with which it would be used. Because of this inconvenience, the device is often too cumbersome to use.

The Tektronix device uses both transformer and optical coupling techniques to achieve a DC to 20 mhz band width. Photocouplers are used at low frequencies, transformers are used at high frequencies, and both circuits are used at mid-frequencies where the outputs of both the transformers and the photocouplers are added together. This combination of outputs is difficult to adjust for uniform gain over a wide frequency range.

Isolator circuits are also found in isolation amplifiers. Typical isolation circuits for these amplifiers are found in the following U.S. Pat. Nos. 3,988,690, 4,066,974, 4,163,950, 4,191,929.

The device of the present invention satisfies the problems and shortcomings identified above and affords other features and advantages heretofore not obtainable.

SUMMARY OF THE INVENTION

It is among the objects of the present invention to provide a circuit isolation device for converting an initial voltage signal floating at some voltage potential to a representative voltage signal at ground potential wherein the initial voltage signal may have a wide range of frequencies or in fact be a DC voltage.

Another object is to provide a circuit isolation device of the type described which is of low cost, compact construction.

Still another object is to provide a circuit isolation device wherein the effect of the modulating circuit on the representative voltage signal at the output of the device is minimized.

These and other objects and advantages are obtained with the novel circuit isolation device of the invention which is effective to convert an initial voltage signal floating at some voltage potential to a representative voltage signal at a different voltage potential--generally ground. The device includes a transformer with a center-tapped primary winding, a centertapped secondary winding and a core magnetically coupling the primary and second windings. The initial voltage signal is coupled by means of an input terminal to the center tap of the primary winding. A modulator circuit is connected to the primary winding at opposite ends thereof and includes modulator switching means that isolate, or provide no direct current path between the input and output of the isolator for alternately applying the initial voltage signal to opposite sections of the primary winding at a modulating frequency sufficiently high to assure very low magnetic flux density in the core, thus maintaining a high input impedance. The modulator switching means may, for example, be either a photo diode/transistor pair where the light link provides the electrical isolation or a transistor driven through a transformer where the transformer provides the necessary isolation. A demodulator circuit is connected to the secondary winding and includes switching means for alternately connecting each end of the secondary winding to a common return point to demodulate the voltage signal from the center tap of the secondary winding at a demodulating frequency that is identical to the modulating frequency.

The modulating and demodulating functions are controlled by a control circuit that may be at the same voltage potential as either the demodulator circuit (generally ground) or the modulator circuit for operating the modulator switching means and the demodulator circuit switching means in phase with the modulator circuit switching means. Accordingly, the demodulated voltage signal at the output terminals of the device is representative of the initial voltage signal presented to the input terminals.

In accordance with one aspect of the invention the effect of the switching action produced in the modulating circuit is minimized by synchronizing the control signals produced by the control circuit to the trigger rate of a test instrument with which the circuit isolation device of the invention is used.

In accordance with still another aspect of the invention, the effect of the switching signals of the modulating circuit is eliminated by using two centertapped transformers in parallel, with their respective modulating circuits out of phase with one another.

DESCRIPTION OF THE PREFERRED EMBODIMENT

Figure 1:
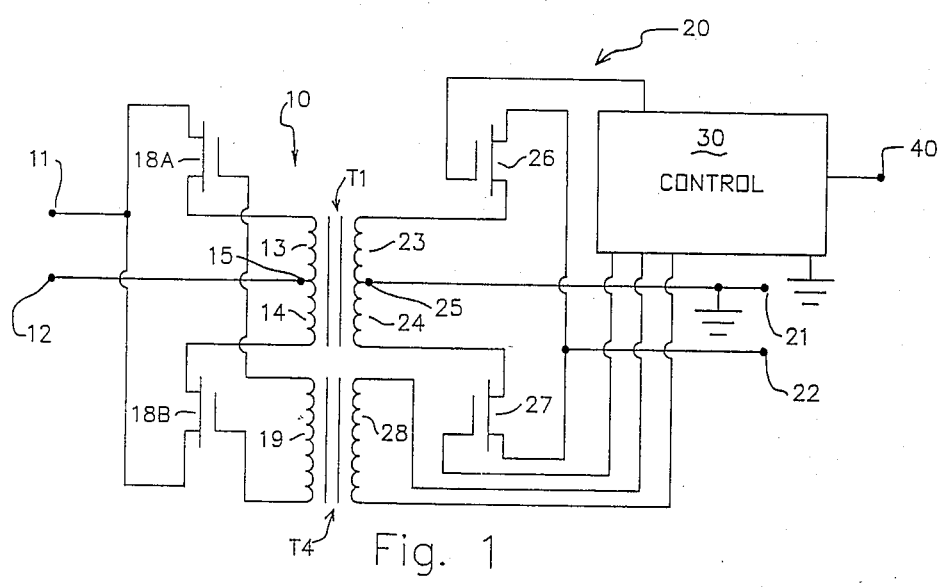
FIG. 1 is a schematic diagram of a circuit isolation device embodying the invention.

Referring more particularly to the drawings, and initially to FIG. 1, there is shown a circuit isolation device for converting an initial voltage signal floating at some voltage potential to a representative voltage signal at a different voltage potential and embodying a unique arrangement of circuit elements in accordance with the invention.

The device comprises as its basic components a center-tapped transformer T1, a modulator circuit 10, a demodulator circuit 20 and a control circuit 30. The device is adapted to receive a voltage signal that is "floating" above ground potential and which is to be analyzed, for example, by an oscilloscope or other electrical instrument that is desirably maintained at ground potential. The transformer T1 has a primary winding with two sections 13 and 14 separated by a center tap 15. The center tap 15 is connected to the input terminal 12.

The input voltage signal (FIG. 2e) is applied to the primary sections 13 and 14 of the transformer T1 alternately by means of a pair of switching elements, such as field effect transistors (FETs) 18A and 18B located in parallel branches of the modulator circuit. The parallel branches are connected between the terminal 11 and opposite ends of the transformer T1 primary. The polarity of the voltage signal applied to the transformer T1 primary windings is reversed periodically by the FETs 18A and 18B (FIGS. 2a and 2b) which serve as switches. The lowest frequency component applied to the transformer T1 primary windings is that of the periodic switching of the FETs 18A and 18B so that saturation of the transformer T1 core may be avoided even if the input signal is of very low or even zero frequency (DC). Control signals are coupled from control circuit 30 to the primary winding 28 of transformer T4 and appear then at secondary winding 19 connected to FETs 18A and 18B.

The demodulator circuit 20 has a pair of output terminals 21 and 22 which may be connected to an oscilloscope or other electrical instrument to be isolated from the initial voltage signal. The transformer T1 secondary winding includes two winding sections 23 and 24 separated by a center tap 25 which is connected to the output terminal 21. Another pair of switching elements, such as field effect transistors 26 and 27 (FETs), are connected in parallel between the output terminal 22 and opposite ends of the secondary winding. The FETs 26 and 27 are alternately switched (FIGS. 2c and 2d) in phase with the switching of the FETs 18A and 18B so that the elements 18A and 26 are on while the elements 18b and 27 are off, and vice versa.

Accordingly, the initial voltage signal (FIG. 2e) is regularly and periodically modulated by the switching effect of the FETs 18A and 18B with the resultant modulated signal applied to the primary winding of the transformer T1. The transformer action results in an essentially identical signal appearing at the secondary windings of the transformer T1, although the magnitude of the signal may be increased or decreased depending upon the transformer turns ratio.

This secondary signal is demodulated by the switching action of the FETs 26 and 27. The output of the demodulator circuit 20 (FIG. 2f) is thus representative or, in effect, a reconstruction of the initial voltage signal applied to the input terminals 11 and 12.

The switching elements 18A, 18B, 26, 27 should ideally be solid state devices having a high "off" state impedance, a low "on" state impedance, and no threshhold or offset voltage. In addition, these devices should be symmetrical, i.e., the characteristics should be the same for either polarity of the input signal. Bilateral FETs are particularly suited. The switching elements 18A, 18B, 26 and 27 may be individual, discrete transistors, or parts of an integrated circuit containing multiple devices, such as an RCA CD4066 or equivalent.

Figure 2:
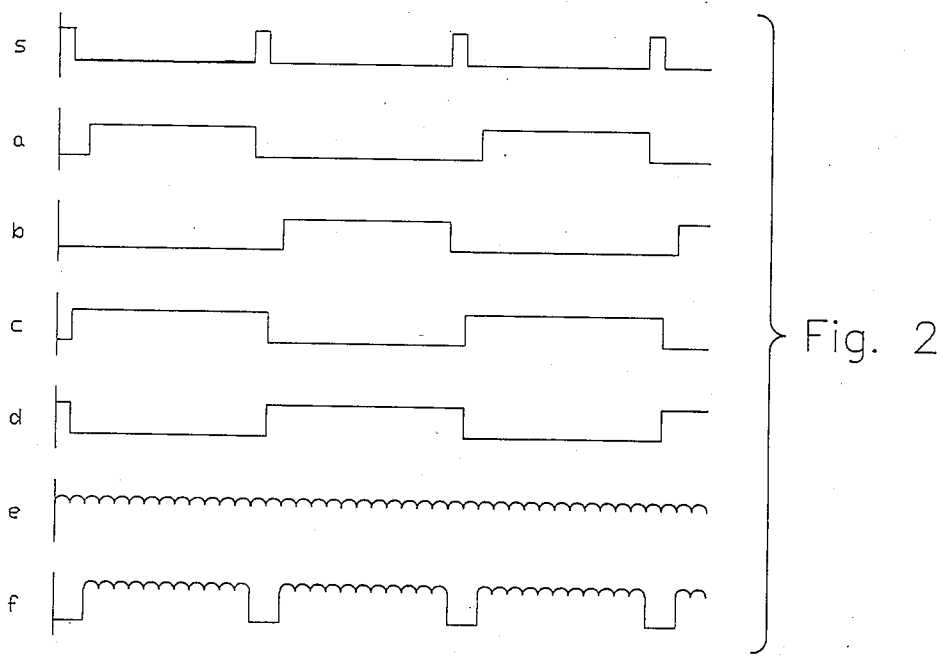
FIG. 2 is a series of graphs illustrating the phasing of the synchronizing voltage(s) and the switching voltages (a, b, c and d) used to trigger the switching elements shown in FIGS. 1 and 5, the initial voltage signal waveform (e) and the representative voltage signal waveform (f) at the output terminals of the device.

The switching of the elements 18A, 18B, 26, 27 is accomplished by means of the control circuit 30 to produce the control phasing illustrated in FIG. 2. Since the FETs 26 and 27 are on the secondary or output side of the isolator and thus generally at ground potential they may be driven by direct electrical interconnection with the control circuit. The elements 18A and 18B, on the other hand, are on the isolated, or primary, side of the isolator and must be operated in such a way that isolation is maintained, preferably without the use of an additional isolated power supply. This requirement is satisfied by coupling the control circuit 30 signals through transformer T4.

The control circuit must drive the switching elements such that the elements 18A and 26 are "on" while the elements 18B and 27 are "off", and vice versa. A further consideration is that the "on" periods for the elements 18A and 18B must not be allowed to overlap due to the finite switching speeds of these devices. If the elements 18A and 18B are on simultaneously, the input to the isolator circuit will present a short circuit to the signal source. This can be avoided if the control circuit provides a "dead" time, or a brief interval between the turn-off of one switching element and the turn-on of the alternate switching element. This dead time should be slightly longer than the worst case turn-off time for the switching devices used.

The dead time is not required, however, for the FETs 26 and 27 because if these devices have overlapping "on" periods, the overlap will occur during the dead time of the elements 18A and 18B. Accordingly, there will be no effect on the signal source.

In FIG. 1, the control circuit 30 is synchronized with the trigger rate of the oscilloscope or other electrical instrument so that the switching transitions of the invention take place during the retrace period of the oscilloscope or a similar dead time in other electrical devices. A triggering voltage (FIG. 2s) from the oscilloscope or other electrical instrument is applied to terminal 40 to supply this synchronization.

A control circuit 30 capable of providing the desired trigger signals described above may be readily designed by a person skilled in the art and will not be discussed in detail herein.

Although the circuit isolation device illustrated in FIG. 1 uses a center-tapped winding and two switching elements on both the primary and secondary sides, a bridge configuration of four switching elements and a nontapped winding could be substituted on either the primary, the secondary, or both sides of the circuit. This applies to the basic circuit described above, as well as to more complex circuits to be described below.

Figure 3:
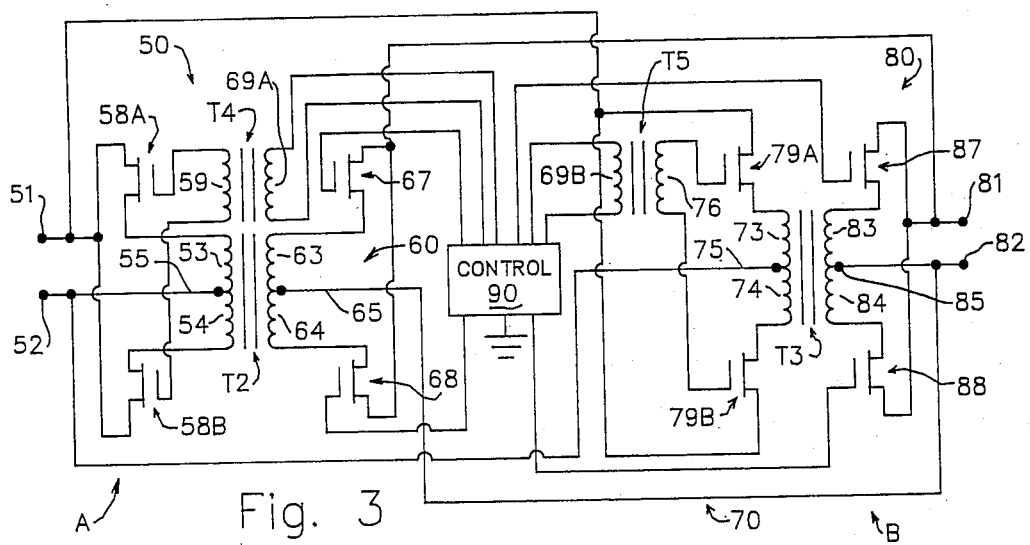
FIG. 3 is a schematic diagram of a circuit isolation device embodying a modified form of the invention.
Figure 4:
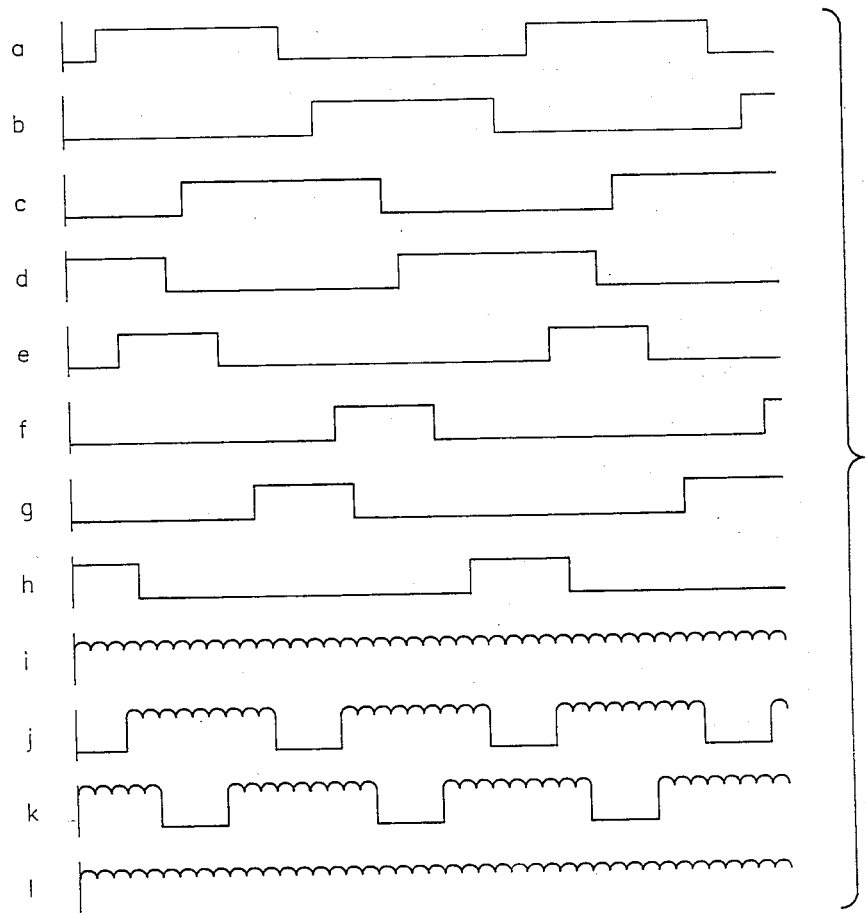
FIG. 4 is a series of graphs illustrating the phasing of the signal voltages (a, b, c, d, e, f, g and h) used to trigger the switching elements shown in FIGS. 3 and 6, the initial voltage signal (i) presented at the input terminals, the representative voltage signal (j) produced by one demodulator circuit section, the representative voltage signal (k) produced at the other demodulator circuit section and the resulting representative voltage signal (l) produced at the output terminals of the device.

Dual Modulator Arrangement Utilizing Transformer-Isolated Switching Means (FIGS. 3 and 4)

FIGS. 3 and 4 illustrate another embodiment of the invention which is adapted to eliminate the potential disturbance caused by the dead time described above.

As illustrated in FIG. 3, the modified isolator device includes two isolator sections A and B and a pair of center-tapped transformers T2 and T3, one for each of the two isolator sections, and a control circuit 90.

The isolator section A comprises a modulator circuit 50, the center-tapped transformer T2 and a demodulator circuit 60. The modulator circuit 50 is adapted to receive an initial voltage signal (FIG. 4i) at a "floating" potential at input terminals 51 and 52. The transformer T2 has a primary winding with two sections 53 and 54 separated by a center tap 55. The initial voltage signal is applied to the primary winding of the transformer T2 by means of the switching effect of a pair of switching elements 58A and 58B located in parallel branches connected between the input terminal 51 and opposite ends of the primary winding.

The demodulator circuit 60 includes the secondary winding of the transformer T2 which includes two winding sections 63 and 64 separated by a center tap 65. The signal induced in the secondary winding is demodulated by means of a pair of switching elements 67 and 68 located in parallel branches that are connected at opposite ends of the secondary winding illustrated in FIG. 3. Transformer T4 couples the control signals applied to primary winding 69A to secondary winding 59, which is connected to switching elements 58A and 58B. The control circuit 90 is thereby isolated from the input potential applied to terminals 51 and 52.

Isolator section B is essentially identical to isolator section A except that the control circuit 90 is adapted to supply the control signals to the modulator circuit 70 and demodulator circuit 80 phase shifted with respect to the corresponding control signals supplied to modulator circuit 50 and demodulator circuit 60. As in the case of the isolator section A, the modulator circuit 70 includes primary windings for the transformer T3, including transformer sections 73 and 74 separated by a center tap 75. The center tap 75 (as the center tap 55) is connected to the input terminal 52 and a pair of switching elements 79A and 79B are located in parallel branches connected between the input terminal 51 and opposite ends of the primary winding of the transformer T3.

The demodulator circuit 80 includes a pair of output terminals 81 and 82 that are essentially the output terminals of the circuit isolator device. The circuit 80 includes the secondary winding of the transformer T3 which has two secondary sections 83 and 84 separated by a center tap 85 connected to the output terminal 82. A pair of switching elements 87 and 88 are located in parallel branches connected between the output terminal 81 at opposite ends of the secondary winding of the transformer T3. Transformer T5 couples the control signals applied to primary winding 69B to secondary winding 76, which is connected to switching elements 79A and 79B. The control circuit 90 is thereby isolated from the input potential applied to terminals 51 and 52.

The control of the modulator circuits 50 and 70 and the demodulator circuits 60 and 80 is illustrated in FIG. 4, parts a through h. The phasing of the switching elements 58A and 58B of the modulator circuit 50 is illustrated in FIGS. 4a and 4b, of the elements 67 and 68 of the demodulator circuit 60 in FIGS. 4e and 4f, of the elements 79A and 79B of the modulator circuit 70 in FIGS. 4c and 4d, and of the elements 87 and 88 of the demodulator circuit 80 in FIGS. 4g and 4h.

It will be noted that the modulation achieved by the circuits 50 and 70 is out of phase so that the dead spaces are likewise offset. Accordingly, the outputs of isolator sections A and B would appear as shown in parts j and k of FIG. 4 if they were not connected in parallel. The resulting representative output voltage signal that appears across the terminals 81 and 82 is illustrated in part 1, and it will be noted that the effect of the dead spaces between modulation phases has been eliminated.

Both isolator sections A and B are operated in the same manner and at the same frequency, but the operation of the isolator circuit B is phase shifted from that of the isolator circuit A such that the "off" time of each isolator occurs during a period in which no switching occurs in the other isolator section.

Figure 5:
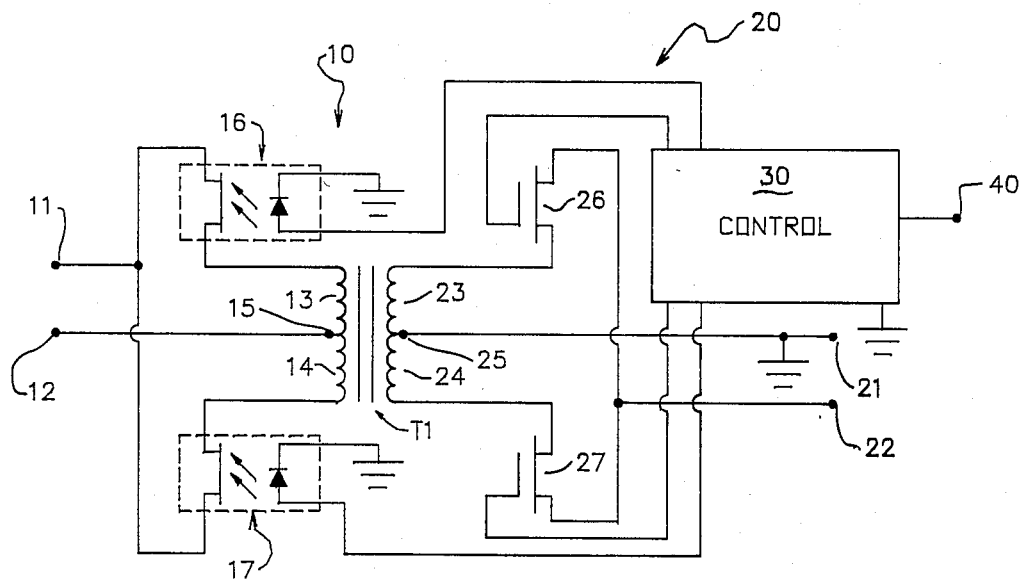
FIG. 5 is an alternate schematic diagram of a circuit isolation device embodying the invention.

Embodiment of the Invention Utilizing Photo-Responsive Switching Means (FIG. 5)

Referring to FIG. 5, there is shown a circuit isolation device of modified design for converting an initial voltage signal floating at some voltage potential to a representative voltage signal at a different voltage potential and embodying another arrangement of circuit elements in accordance with the invention.

The device comprises as its basic components (corresponding to those of FIG. 1) a center-tapped transformer T1, a modulator circuit 10, a demodulator circuit 20 and a control circuit 30. The transformer T1 has a primary winding with two sections 13 and 14 separated by a center tap 15. The center tap 15 is connected to the input terminal 12.

The input voltage signal is applied to the primary sections 13 and 14 of the transformer T1 alternately by means of a pair of switching elements, such as photo FETs 16 and 17 located in parallel branches of the modulator circuit. The parallel branches are connected between the terminal 11 and opposite ends of the transformer primary. The polarity of the voltage signal applied to the transformer primary windings is reversed periodically by the photo FETs 16 and 17 which serve as switches. The lowest frequency component applied to the transformer primary windings is that of the periodic switching of the photo FETs 16 and 17 so that saturation of the transformer core may be avoided even if the input signal is of very low or even zero frequency (DC).

The demodulator circuit 20 has a pair of output terminals 21 and 22 which may be connected to an oscilloscope or other electrical instrument to be isolated from the initial voltage signal. The transformer secondary winding includes two winding sections 23 and 24 separated by a center tap 25 which is connected to the output terminals 21. Another pair of switching elements, such as field effect transistors 26 and 27 (FETs), are connected in parallel between the output terminal 22 and opposite ends of the secondary winding. The FETs 26 and 27 are alternately switched in phase with the switching of the photo FETs 16 and 17 so that the elements 16 and 26 are on while the elements 17 and 27 are off, and vice versa.

Accordingly, the initial voltage signal is regularly and periodically modulated by the switching effect of the photo FETs 16 and 17, with the resultant modulated signal applied to the primary winding of the transformer T1. The transformer action results in an essentially identical signal appearing at the secondary windings of the transformer, although the magnitude of the signal may be increased or decreased depending upon the transformer turns ratio.

This secondary signal is demodulated by the switching action of the FETs 26 and 27. The output of the demodulator circuit 20 is thus representative or, in effect, a reconstruction of the initial voltage signal applied to the input terminals 11 and 12.

The switching elements 16, 17, 26, 27 should ideally be solid state devices having a high "off" state impedance, a low "on" state impedance, and no threshhold or offset voltage. In addition, these devices should be symmetrical, i.e., the characteristics should be the same for either polarity of the input signal. Bilateral FETs are particularly suited. The switching elements 26 and 27 may be individual, discrete transistors, or parts of an integrated circuit containing multiple devices, such as an RCA CD4066 or equivalent.

In FIG. 5, the control circuit 30 is synchronized with the trigger rate of the oscilloscope or other electrical instrument so that the switching transitions of the invention take place during the retrace period of the oscilloscope or a similar dead time in other electrical devices. A triggering voltage from the oscilloscope or other electrical instrument is applied to terminal 40 to supply this synchronization.

The switching of the elements 16, 17, 26, 27 is accomplished by means of the control circuit 30. Since the FETs 26 and 27 are on the secondary or output side of the isolator, and thus generally at ground potential, they may be driven by direct electrical interconnection with the control circuit. The elements 16 and 17, on the other hand, are on the isolated, or primary, side of the isolator and must be operated in such a way that isolation is maintained, preferably without the use of an additional isolated power supply.

This requirement is satisfied through the use of light sensitive FETs or photo FETs. These devices may be separate, discrete transistors driven by separate light sources, such as light emitting diodes (LEDs), which are in turn driven by the control circuit 30 located on the secondary side of the transformer T. The preferred approach, however, is to use integrated isolator circuits which combine the LED and photo FET in a single package such as the G.E. H11F1 series. These integrated isolator devices can also be used for the switching means 26 and 27 on the secondary side if desired even though isolation of the secondary circuit from the control and drive circuitry is not generally required.

The control circuit must drive the switching elements such that the elements 16 and 26 are "on" while the elements 17 and 27 are "off", and vice versa. A further consideration is that the "on" periods for the elements 16 and 17 must not be allowed to overlap due to the finite switching speeds of these devices. If the elements 16 and 17 are on simultaneously, the input to the isolator circuit will present a short circuit to the signal source. This can be avoided if the control circuit provides a "dead" time, or a brief interval between the turn-off of one switching element and the turn-on of the alternate switching element. This dead time should be slightly longer than the worst case turn-off time for the switching devices used.

The dead time is not required, however, for the FETs 26 and 27 because if these devices have overlapping "on" periods, the overlap will occur during the dead time of the elements 16 and 17. Accordingly, there will be no effect on the signal source. The worst case switching speed for the G.E. H11F1 integrated photo isolator is 15 microseconds. Thus, with these devices a dead time of 20 microseconds would be completely adequate.

The isolator device described above and illustrated in FIG. 5 is most useful for relatively low frequency signals. The dead time necessitated by the switching speeds of the photo FETs 16 and 17 limits the application of the isolator device shown to situations where the signal to be observed or measured is "slow" or of a much longer period than the dead time.

Figure 6:
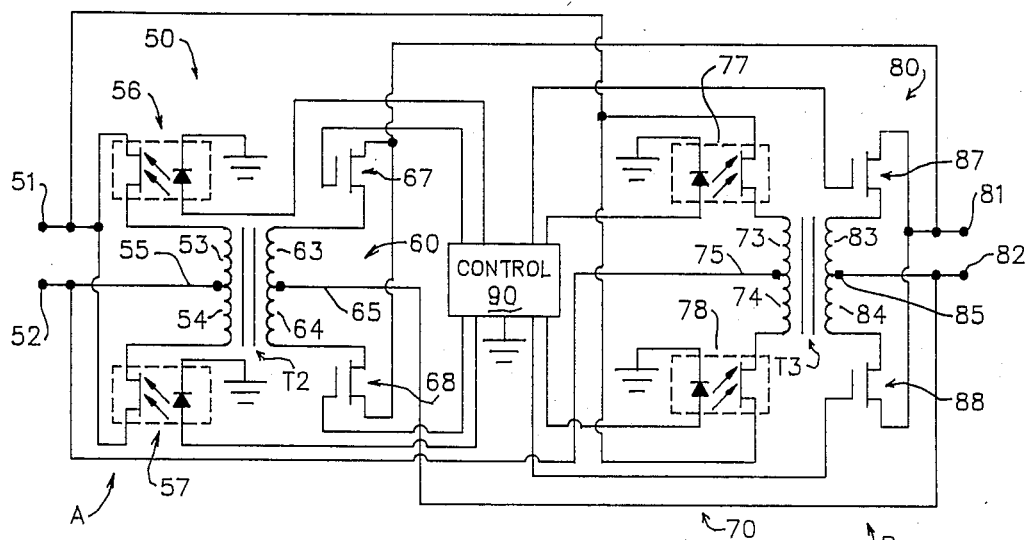
FIG. 6 is an alternate schematic diagram of a circuit isolation device embodying a modified form of the invention.

Dual Modulator Arrangement (FIG. 6)

FIG. 6 illustrates still another embodiment of the invention which is adapted to eliminate the potential disturbance caused by the dead time described above.

As illustrated in FIG. 6, the modified isolator device includes (corresponding to FIG. 3) two isolator sections A and B and a pair of center-tapped transformers T2 and T3, one for each of the two isolator sections, and a control circuit 90.

The isolator section A comprises a modulator circuit 50, the center-tapped transformer T2 and a demodulator circuit 60. The modulator circuit 50 is adapted to receive an initial voltage signal at a "floating" potential at input terminals 51 and 52. The transformer T2 has a primary winding with two sections 53 and 54 separated by a center tap 55. The initial voltage signal is applied to the primary winding of the transformer T2 by means of the switching effect of a pair of switching elements 56 and 57 located in parallel branches connected between the input terminal 51 and opposite ends of the primary winding.

The demodulator circuit 60 includes the secondary winding of the transformer T2 which includes two winding sections 63 and 64 separated by a center tap 65. The signal induced in the secondary winding is demodulated by means of a pair of switching elements 67 and 68 located in parallel branches that are connected at opposite ends of the secondary winding illustrated in FIG. 6.

Isolator section B is essentially identical to isolator section A except that the control circuit 90 is adapted to alternate the phasing of the control signals to the modulator circuit 70 and demodulator circuit 80. As in the case of the isolator section A, the modulator circuit 70 includes primary windings for the transformer T3, including transformer sections 73 and 74 separated by a center tap 75. The center tap 75 (as the center tap 55) is connected to the input terminal 52 and a pair of switching elements 77 and 78 are located in parallel branches connected between the input terminal 51 and opposite ends of the primary winding of the transformer T3.

The demodulator circuit 80 includes a pair of output terminals 81 and 82 that are essentially the output terminals of the circuit isolator device. The circuit 80 includes the secondary winding of the transformer T3 which has two secondary sections 83 and 84 separated by a center tap 85 connected to the output terminal 82. A pair of switching elements 87 and 88 are located in parallel branches connected between the output terminal 81 at opposite ends of the secondary winding of the transformer T3.

It will be noted that the modulation achieved by the circuits 50 and 70 is out of phase so that the dead spaces are likewise offset. Accordingly, the outputs of isolator sections A and B would appear as shown in parts j and k of FIG. 4 if they were not connected in parallel. The resulting representative output voltage signal that appears across the terminals 81 and 82 is illustrated in part 1, and it will be noted that the effect of the dead spaces between modulation phases has been eliminated.

Both isolator sections A and B are operated in the same manner and at the same frequency, but the operation of the isolator circuit B is phase shifted from that of the isolator circuit A such that the "off" time of each isolator occurs during a period in which no switching occurs in the other isolator section.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. An instrument isolator for isolating a voltage signal at a floating potential, applied to a pair of input terminals of one circuit, from an electrical instrument at ground potential adapted to receive and process said voltage signal and having a display consisting of a periodically repeated electronic image with a time interval between images initiated by a cyclically triggered signal, comprising:

a first transformer with a center-tapped first primary winding, a center-tapped first secondary winding and a core magnetically coupling the first primary and second secondary windings;

terminal means coupling said voltage signal directly to the center tap of said first primary winding;

a modulator circuit connected to said first primary winding for alternately applying said voltage signal to opposite sections of said first primary winding and including modulator switching elements for alternately switching said modulator circuit at a suitable modulating frequency;

a demodulator circuit connected to said first secondary winding for alternately connecting each end of the first secondary winding to a common return point to demodulate the output signal from the center tap of the first secondary winding and including demodulator switching elements in phase with said modulator switching elements for alternately switching said demodulator circuit;

control means for operating said modulator switching elements and said demodulator switching elements to provide a time interval between alternating pulses of said modulating frequency so as to avoid overlap between half cycles; and a second transformer with a second primary winding and a second secondary winding magnetically coupled to said second primary winding; said control means being operatively connected to said second primary winding and said modulator switching elements being operatively connected to said second secondary winding;

said control means being operatively connected to said electrical instrument whereby said trigger signal synchronizes said time interval between images with said time interval between alternating pulses of said modulating frequency, whereby the demodulator output signal is representative of said input voltage signal and electrically isolated from said input terminals and said time interval between pulses is not visible on said instrument display.

2. A device as defined in claim 1, wherein said modulator switching elements comprise a pair of field effect transistors.

3. A device as defined in claim 1, wherein said demodulator switching elements comprise a pair of field effect transistors.

4. An instrument isolator for isolating a voltage signal at a floating potential applied to a pair of input terminals of one circuit from a signal receiving circuit comprising:

a first isolator section and a second isolator section connected in parallel with one another, each of said isolator sections comprising:

a first transformer with a center-tapped first primary winding, a center-tapped first secondary winding and a core magnetically coupling the first primary and first secondary windings;

terminal means connected to the center tap of said first primary winding and adapted to receive a voltage signal;

a modulator circuit connected to said first primary winding for alternately applying said voltage signal to opposite sections of said first primary winding and including modulator switching elements for alternately switching said modulator circuit at a suitable modulating frequency;

a demodulator circuit connected to said first secondary winding for alternately connected each end of the first secondary winding to a common return point to demodulate the output signal from the center tap of the first secondary winding and including demodulator switching elements in phase with said potential-difference-isolating switch means for alternately switching said demodulator circuit; and a second transformer with a second primary winding and a second secondary winding magnetically coupled to said second primary winding; said control means being operatively connected to said second primary winding and said modulator switching elements being operatively connected to said second secondary winding;

control means operatively connected to both of said isolator sections for operating said modulator switching elements of each section and said demodulator switching means of each section in a manner such that the modulator circuits and demodulator circuits of said two sections are in staggered phase relation to one another;

whereby the demodulator output voltage signal from said parallel isolator section is representative of the input voltage signal to said parallel isolator sections and electrically isolated from said input terminals.

5. A device as defined in claim 4, wherein said modulator switching elements comprise a pair of field effect transistors.

6. A device as defined in claim 4, wherein said demodulator switching elements comprise a pair of field effect transistors.

* * * * *

UNITED STATES PATENT AND TRADEMARK OFFICE
CERTIFICATE OF CORRECTION

PATENT NO. : 4,747,035

DATED : May 24, 1988

INVENTOR(S) : Howard H. Bobry

It is certified that error appears in the above-identified patent and that said Letters Patent is hereby corrected as shown below:

Col. 1, line 15, "Normally . . ." should start at line 14, following --instrument.--

Col. 1, line 23, "signal" should be inserted after --voltage--.

Col. 2, line 54, "centertapped" should read as --center-tapped--.

Col. 10, line 19, claim 1, "second" should read as --first--.

Signed and Sealed this

Twenty-fifth Day of October, 1988

Attest:

DONALD J. QUIGG

Attesting Officer

Commissioner of Patents and Trademarks